United States Patent
Lehmann et al.

(10) Patent No.: US 7,246,164 B2
(45) Date of Patent: Jul. 17, 2007

(54) DISTRIBUTED PERSONAL RELATIONSHIP INFORMATION MANAGEMENT SYSTEM AND METHODS

(75) Inventors: Jens-Michael Lehmann, El Cerrito, CA (US); Michael Wynblatt, Pleasant Hill, CA (US); Michael Nestler, Berkeley, CA (US)

(73) Assignee: Whoglue, Inc., Baltimore, MD (US)

( * ) Notice: Subject to any disclaimer, the term of this patent is extended or adjusted under 35 U.S.C. 154(b) by 513 days.

(21) Appl. No.: 10/141,078

(22) Filed: May 9, 2002

(65) Prior Publication Data

US 2002/0169782 A1 Nov. 14, 2002

Related U.S. Application Data

(60) Provisional application No. 60/290,421, filed on May 10, 2001.

(51) Int. Cl.
*G06F 15/173* (2006.01)
(52) U.S. Cl. ............... 709/225; 709/217; 709/218; 709/223; 709/226; 709/227; 709/229; 707/10
(58) Field of Classification Search ............ 709/204, 709/205, 217, 218, 223, 226, 227, 229; 707/10; 705/10, 35
See application file for complete search history.

(56) References Cited

U.S. PATENT DOCUMENTS 5,220,657 A * 6/1993 Bly et al. ............... 711/152
6,092,199 A * 7/2000 Dutcher et al. .......... 713/201
6,237,099 B1 * 5/2001 Kurokawa ............... 713/200
6,301,609 B1   10/2001 Aravamudan et al.
6,349,238 B1 * 2/2002 Gabbita et al. .......... 700/101
6,515,765 B1 * 2/2003 Umebayashi ............ 358/1.9
6,677,968 B1 * 1/2004 Appelman ............... 715/853
6,714,931 B1 * 3/2004 Papierniak et al. ........ 707/10
6,839,681 B1 * 1/2005 Hotz ....................... 705/10
7,080,139 B1 * 7/2006 Briggs et al. ............ 709/224
2001/0049620 A1 * 12/2001 Blasko ..................... 705/10
2002/0006803 A1 * 1/2002 Mendiola et al. ........ 455/466
2002/0059201 A1   5/2002 Work
2002/0103734 A1 * 8/2002 Glassco et al. .......... 705/35
2002/0103761 A1 * 8/2002 Glassco et al. .......... 705/59
2002/0147625 A1 * 10/2002 Kolke ...................... 705/9
2004/0148275 A1 * 7/2004 Achlioptas ............... 707/3

* cited by examiner

*Primary Examiner*—Saleh Najjar
*Assistant Examiner*—Liang-che Alex Wang
(74) *Attorney, Agent, or Firm*—RatnerPrestia

(57) ABSTRACT

An information management system, method and computer program code and means for facilitating communications between user members of an online network is provided which includes receipt, from a first user of an online network, of an identification of a second user of the online network. An indication of an association level of the second user is also received. First information having an association level different from the second user and second information having an association level corresponding to the second user is also received from the first user. Only the second information based on the association level is transmitted to the second user.

28 Claims, 16 Drawing Sheets

| USER DATABASE 300 | | | | | | |
|---|---|---|---|---|---|---|
| USER IDENTIFIER 302 | PASSWORD 304 | USER NAME 306 | PROFILE INFORMATION 308 | NETWORKING CLUB ASSOCIATIONS 310 | ASSOCIATED USERS 312 | USER PREFERENCES 314 |
| USER1@XYZ1.COM | 1A2B | WILLIAM SMITH | 123 Main Street Anytown, USA 00001 | | USER2@USRZ.ORG; USER4@XZXZ.CO.UK | PRIORITIZE BY USER THEN INFORMATION TYPE |
| USER2@USRZ.ORG | 905T89G | ROBERT JONES | Education: B.S.C.S. - 1992 University of Michigan | Online Software Developers Group | USER1@XYZ1.COM | PRIORITIZE BY INFORMATION TYPE THEN BY USER |
| USER3@ABCCO.CN | 1221AVVV | HAYLEY CHIN | Vice President, MegaCorp, Inc. | | USER1@XYZ1.COM; USER2@USRZ.ORG | NEWSPAPER FORMAT: TWO COLUMNS |
| USER4@XZXZ.CO.UK | NO9KP45 | ANUSH PATHAK | Languages: English, Urdu, Hindi | | USER2@USRZ.ORG | FONT SIZE: 14 FONT COLOR: BLUE |

FIG. 3

INFORMATION DATABASE 400

| USER IDENTIFIER 302 | INFORMATION TYPE 404 | INFORMATION TEXT 406 | ACCESS RIGHTS 408 | EXCLUDED MEMBERS 410 | INCLUDED MEMBERS 412 | DATE CREATED 414 |
|---|---|---|---|---|---|---|
| USER1@XYZ1.COM | NEWS | MRS. SMITH AND I CELEBRATE THE ARRIVAL OF OUR FIRST CHILD | CLOSE FRIENDS | | USER2@USRZ.ORG | 3/1/02 |
| USER4@XZXZ.CO.UK | PROFILE | Languages: English, Urdu, Hindi | ALL | | | 3/1/02 |
| USER4@XZXZ.CO.UK | NEWS | I HAVE STARTED MY OWN DOCUMENT TRANSLATION COMPANY PLEASE CONTACT ME IF YOU ARE IN NEED OF TRANSLATION SERVICES | ALL | | | 3/1/02 |
| USER4@XZXZ.CO.UK | RECOMMENDATION | THE LATEST ITALIAN RESTAURANT TO OPEN DOWNTOWN IS FANTASTIC | COLLEAGUES; CLOSE FRIENDS | USER1@XYZ1.COM | | 3/1/02 |

FIG. 4

DISTRIBUTED PERSONAL RELATIONSHIP INFORMATION MANAGEMENT SYSTEM AND METHODS

CROSS-REFERENCE TO RELATED APPLICATIONS

This application claims priority under 35 U.S.C. § 119 to U.S. Provisional Patent Application Ser. No. 60/290,421, entitled "Distributed Personal Relationship Information Management System and Methods", filed in the name of Lehmann et al on May 10, 2001, the contents of which are hereby incorporated by reference in their entirety for all purposes

BACKGROUND

The present disclosure relates generally to electrical computers and digital processing systems and, more particularly, to remote data accessing using interconnected networks.

Both wireless technology and the Internet have, in recent years, enabled people to more readily intercommunicate than in previous decades when the telephone and courier services were the predominate forms of communication, These technologies offer new and previously unparalleled forms of communications. Wireless technology, for example, has evolved to include text and electronic mail messaging, in addition to providing voice services by cellular and satellite networks. Likewise, the Internet has given rise to prolific use of electronic mail, instant messaging, chat rooms and the like.

These technological advances have resulted in the convenience of being able to communicate at any time of day and from nearly any location. However, such systems have been designed for particular modes of communication, which are not suitable for all applications. Notably, no current communications medium allows persistent information to be distributed non-intrusively to recipients selected by access level and automatically organized. Examples of applications that may benefit from such a communication medium are personal relationship management, knowledge management, and content management.

For instance, many e-mail software packages allow a user to define of a group of users to which a message is to be transmitted, and may be included under a single group name. This approach has specific drawbacks, however. First, e-mail software sends a message directly to the recipients, which is intrusive on their time and resources. One would never, for example, send an e-mail to all of one's personal acquaintances to announce a small personal event, even though one may wish that all of one's colleagues were made aware of that event Second, e-mail software puts the burden of organizing received information onto the receiver. Although some tools exist for automatically categorizing incoming e-mails, these tools still require the user to explicitly develop a set of rules for organization, a task that is onerous enough that the vast majority users do it ineffectively or not at all. Third, e-mail software distributes information only once, at the time of writing of a message. This means that a sender must know ahead of time the complete set of recipients. If a new person is met after the message is sent, any information previously sent to others must now be manually resent to the new person. Further, this means that the sender cannot easily change the recipients after the message is sent, for example to exclude a user who was previously permitted to access the Accordingly, there is a need for a personal relationship management system that addresses certain problems found in existing technologies.

SUMMARY

What is presented, therefore, is an information management system, method and computer program code and means for facilitating communications between user members of an online network.

According to some embodiments, an identification of a second user of an online network is received from a first user. An indication of an association level of the second user is also received. First information having an association level different from the second user and second information having an association level corresponding to the second user is also received from the first user. Only the second information based on the association level is transmitted to the second user.

According to some embodiments, the first information has a plurality of association levels. In some embodiments, the second information has a plurality of association levels. In some embodiments, the association level includes at least one of an established and a customized association level. In some embodiments, information may be transmitted to at least a third user.

According to some embodiments, profile information is received from a plurality of users and a search request is received from the first user, where the search request includes desired profile information. The profile information of users associated with the first user is filtered based on the search request and an indication of at least one associated user matching the search request is transmitted to the first user. According to some embodiments, an expanded search request may also be submitted According to some embodiments, transmitting may include transmitting all information from all associated users corresponding to the association level established by associated users for a particular user. In some embodiments, information may be presented in newspaper or resume format. In some embodiments, information is transmitted based on an age of the information. In some embodiments, information is presented based on a user preference filter associated with a user.

Further aspects of the present invention will be more readily appreciated upon review of the detailed description of these and various specific embodiments in conjunction with the accompanying drawings.

BRIEF DESCRIPTION OF THE DRAWINGS

FIG. 3 is an exemplary member database stored by the server of FIG. 2;

FIG. 4 is an exemplary information database stored by the server of FIG. 2;

DETAILED DESCRIPTION OF SPECIFIC EMBODIMENTS

Figure 1:
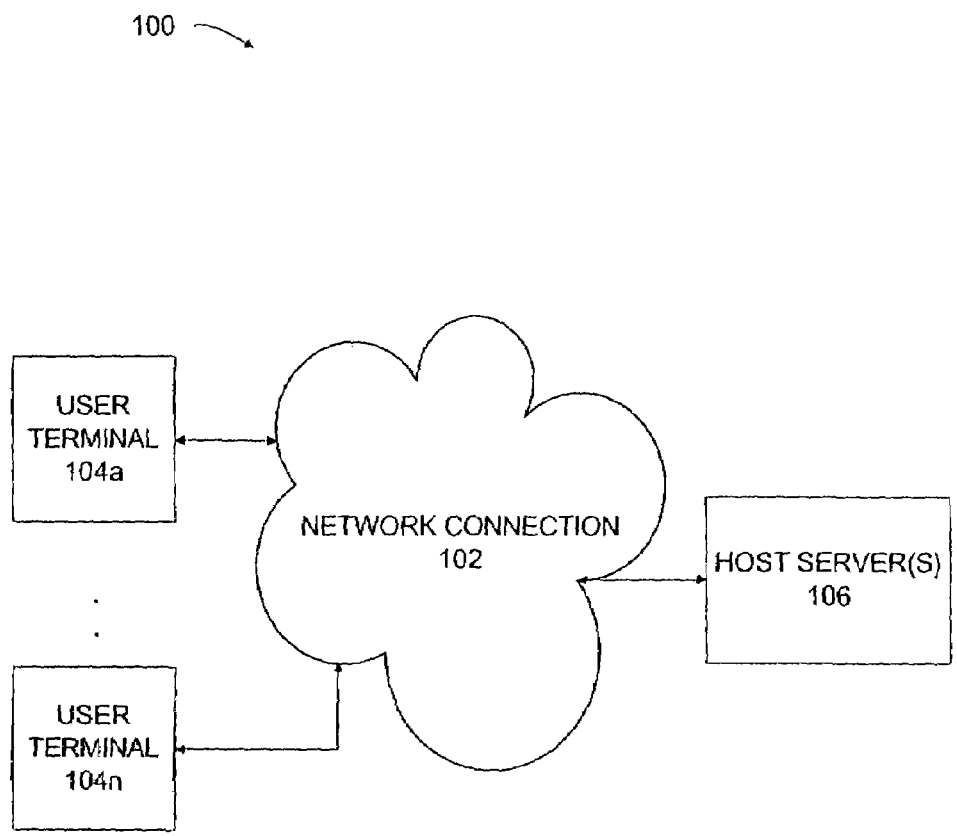
FIG. 1 is a block diagram of an exemplary computer network according to certain embodiments.
Figure 2:
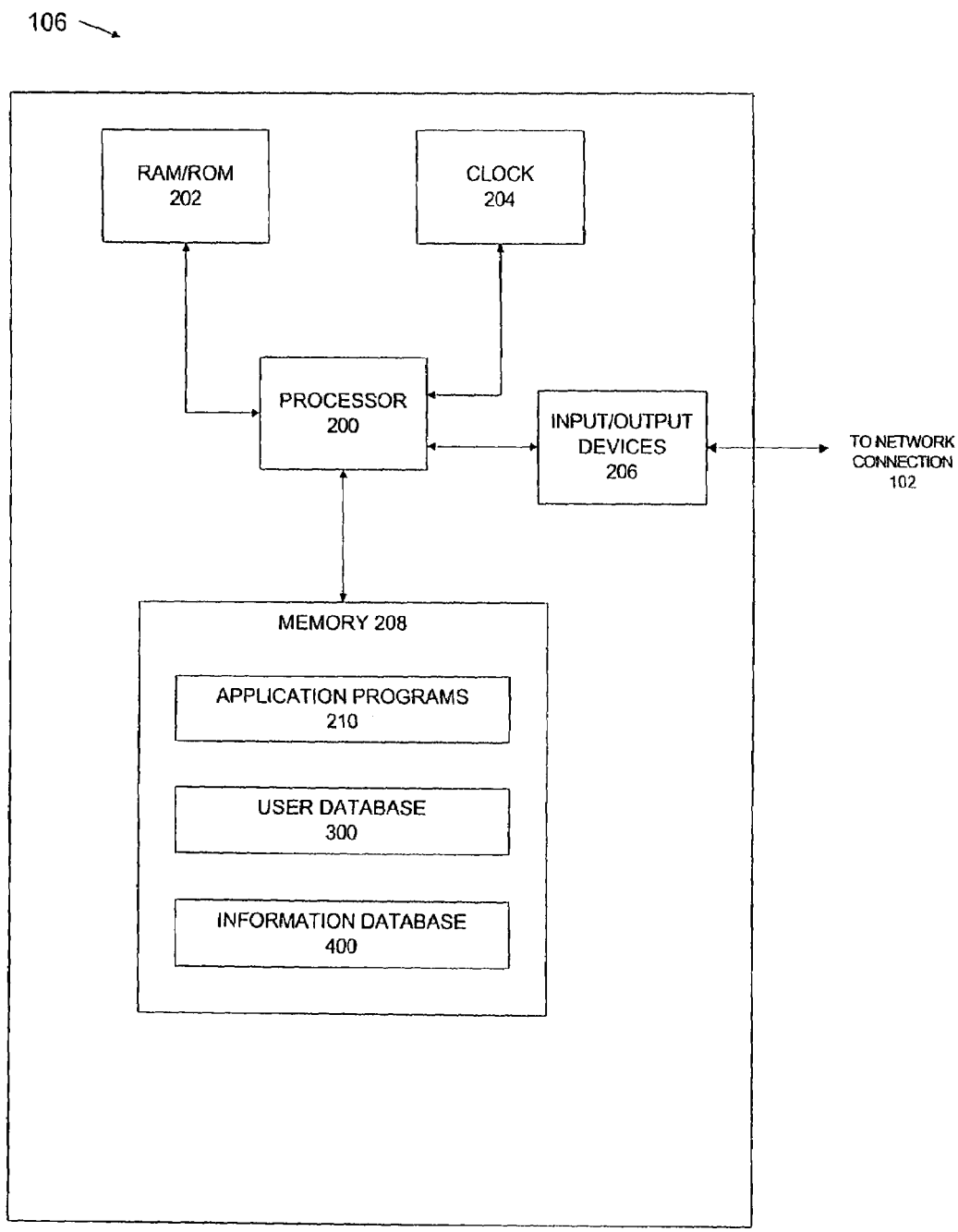
FIG. 2 is a schematic block diagram of an exemplary network server of FIG. 1.

According to some embodiments, a personal relationship management system is provided for managing and sharing information among large groups of users. The system readily facilitates user-managed information flow to groups of associated users That is, members of the online network may control who has access to any given piece of information they create and distribute, as well as what information may be presented to them by other users. The information may be highly structured to facilitate the performance of automated filtering according to the users' individual preferences. Furthermore, such a system may be scalable to accommodate large numbers of users.

In various embodiments, the present system allows users in the online network to mutually agree to become associated. This may happen via a two-way acknowledgement procedure, sometimes referred to herein as a "handshake," by which consenting users within the online network may explicitly approve information flow therebetween.

In addition to the handshake feature, the system may include a template-based method for maintaining structured information and assigning access rights; a set of automated document generation tools with various reader customization options and filters; and a methodology for accessing a plurality of remote data stores containing user information. The system allows users to distribute information nonintrusively by publishing information objects in a system-generated, personalized, newspaper-like electronic publication that becomes tailored to each user based on the user preferences and whether the user is qualified to receive the information, based on preferences set by the author of the information object.

To accommodate the operation of the present system, certain embodiments contemplate the cooperation of one or more distributed servers with which users may interact through, for example, a web-based interface using a specified Internet protocol. The servers allow a new user to create an account, or an existing user to login to their existing account. The server maintains a "contact list" for each user. The contact list or address book includes all other users that are associated with the user. The list is built through the two-way handshake mentioned above, After login, each user may author one or more information objects through a set of predefined templates. The author may then assign access rights to each information object, thus defining which classes of associated users may receive the information object. Only users on the author's connection list can be assigned access rights. This feature prevents an object from being distributed between users who have not performed the two-way handshake Users who have appropriate access rights may then view the object after login. The information may be presented in a newspaper-like format by means of an automated document generation tool having both pre-defined and customizable criteria, selected by the receiving user, for displaying such information objects. Information objects may also be presented in response to a search request initiated by an associated user, when the information matches the search request and specific permissions are obtained.

The automated document generation tool may create information objects in any known electronic text format, including, but not limited to, hyper-text markup language (HTML), extensible markup language (XML), portable document format (PDF), a word processing format, such as Microsoft Word format, or any other suitable format. The information objects may act as collections, summaries, abstracts, or other forms of organization for the data stored in the system by a user. Such information objects may be formed and retrieved through use of a query, a filter and a template, as described in detail herein A query submitted by a user may request particular information object type from the database maintained by the system, and may further include a request for particular subject matter from the stored information objects therein. For example, a user may submit a query for a "job posting" and specify specific dates for such posting as the type of job desired.

Filters are provided so as to allow a user to define allowable information objects that can be presented in his or her newspaper document. The filters may be defined by the user using a set of options provided by the system. Filters may further be used to exclude or prioritize objects within the resulting newspaper document. For example, the user may set a filter to: (1) exclude information objects or particular subsets of information objects from a particular user; (2) exclude job posting objects that do not involve a particular career type; or (3) give priority to a job posting that has a salary above a desired level. A user is never required to activate such filters. In the case where no filtering has been applied, a user may receive all information objects directed to him by associated users.

Templates for generating or viewing information objects may be predefined by the system and may further be customizable by individual users. Object generating templates may have pre-set fields for entering particular types of data. Viewing templates may define bow received information objects are to be presented to a user.

The viewing template may specifically include instructions for how the information objects are to be ordered, structured and formatted in the resulting document. The ordering instructions may describe a priority for all information objects to be presented. For example, a user may include ordering instructions that require all job postings to be listed in ascending order of the salary offered. The structuring instructions may describe how various fields of the information object are to be presented. For example, a general news article may be required to be presented with the title field first, followed by the body text of the information object. The formatting instructions may include a font type, a font size, font color, margins, justification for text, and the like in the information object. The formatting instructions may further include any other types of formatting instructions, such as those found in word processing programs that control from size, font type, line spacing, margins and the like.

The generation of online documents, including information objects from associated users, may be invoked actively by a user in the online network. This may be accomplished by providing a user with selectable hyperlinks that correspond to various document types that the user may select after accessing the system. Alternatively, or in addition thereto, the system may automatically generate a specific document at the time of the user's login with information to be included in accordance with the user's previously entered preferences The information may be time-limited by the system to include only those objects meeting an age criteria, e.g., any information objects less than two weeks old.

Referring now to FIGS. 1-8H, wherein similar components of the present system are referenced in like manner, various embodiments of a personal relationship management system and related methods will be described.

Turning now to FIG. 1, there is depicted an exemplary online network 100 over which a plurality of user terminals 104a-104n may communicate with one or more host servers 106 over a system of electronic and/or wireless network connections 102. The online network 100 may be any one or more of a local area network (LAN), a wide-area network (WAN), an intranet environment, an extranet environment, a wireless network or any other type of computer network, such as those enabled over public switched telephone networks. The online network 100 may also include an Internet-based environment, commonly referred to as the World Wide Web.

The user terminals 104a-104n may each be any type of computing device, such as a personal computer, a workstation, a network terminal, a network server, a hand-held remote access device, a personal digital assistant (PDA) or any other device or combination of devices that can accomplish two-way electronic communication over the network connection 102. Users may access a host sever 106 through a web browser, such as Internet Explorer by Microsoft Corp., or mobile browsers, such as those developed by Palmscape.

In certain embodiments, host server 106 may be one or more servers which cooperate to perform the functions described herein. In a case where multiple servers act as host server 106, such multiple servers may be independently or jointly owned and operated.

In some embodiments, each such host server 106 makes services available to user terminals 104a-n through a standard hypertext transfer protocol/hypertext markup language (HTTP/HTML) interface that utilizes, for example, the Transmission Control Protocol/Internet Protocol (TCP/IP) standard. Such interfaces may be operative to receive information from users and store and distribute such information through a database management program. The system of the present invention interfaces with the database management program through, for example, the well known Open Database Connectivity (ODBC) standard.

In further embodiments, one or more host servers 106 may act as a directory server by maintaining a database of all users of the online network 100 and the host servers 106 through which they are hosted. The directory server is notified as to each new user added by all other host servers 106. The database is updated whenever a user's host server 106 is changed. In the event that a host server 106 needs to know the host of a particular user, that server may send a User Host Resolution (UHR) request to the directory server, including the login identifier of the user in question. The directory server receives the request through its communications daemon and provides a UHR reply which may include the login identifier of the user and the IP address of the user's host server 106. Each host server 106 may, furthermore, cache previous UHR requests, generate an internal directory and periodically update it with comparisons to the list maintained by the directory server, in order to decrease traffic to the directory server over time.

Each such terminal and server described above may further have various cryptographic software capabilities sufficient to allow secure transmission of data therebetween over the online network 100. Other specific functions and operations of user terminals 104a-104n and host servers 106a-106n are discussed further below.

Turning now to FIG. 2A displayed therein are exemplary components of a host server 106. The primary component of host server 106 is a processor 200, which may be any commonly available complex instruction set computer (CISC) or reduced instruction set (RISC)-based processor, for example, the Pentium 4 microprocessor manufactured by Intel Corp. The processor 200 may be operatively connected to further known exemplary components, such as random access memory and read only memory (RAM/ROM) 202, a system clock 204, input/output devices 206, and a memory 208. The memory 208, in turn, stores one or more computer operating system and application programs 210, a user database 300, and an information database 400.

The processor 200 operates in conjunction with random access memory and read-only memory in a manner well known in the art. The random-access memory (RAM) portion of RAM/ROM 202 may be a suitable number of Single In-line Memory Module (SIMM) chips having a storage capacity (typically measured in kilobytes or megabytes) sufficient to store and transfer, inter alia, processing instructions utilized by the processor 200 which may be received from the application programs 210. The read-only memory (ROM) portion of RAM/ROM 202 may be any permanent, non-rewritable memory medium capable of storing and transferring, inter alia, processing instructions performed by the processor 200 during a start-up routine of the host server 106.

The clock 204 may be an on-board component of the processor 200 which dictates a clock speed (typically measured in MHz) at which the processor 200 performs and synchronizes, inter alia, communication between the internal components of the host server 106 The clock 204 may further facilitate synchronized communications between host server 106 with any external computing devices.

The input/output device(s) 260 may be one or more commonly known devices used for receiving system operator inputs, network data, and the like and transmitting outputs resulting therefrom. Accordingly, exemplary input devices may include a keyboard, a mouse, a voice recognition unit and the like for receiving system operator inputs.

Output devices may include any commonly known devices used to present data to a system operator of the host server 106. Accordingly, suitable output devices may include a display, a printer and an audio speaker.

Output devices of the host server may further be operable to transmit data over the online network 100 to, for example, the user terminals 104a-104n. Accordingly, output device may include a telephonic or network connection device, such as a telephone modem, a cable modem, a T-1, T-2 or T-3 or E-1 connection, a digital subscriber line or a network card, wireless transceiver, or the like for communicating data to and from other computer devices over the online network 100. In an embodiment where host server 106 accommodates large numbers of users, it is preferred that the communications devices used as input/output devices 206 have sufficient capacity to handle high bandwidth traffic over the online network 100.

The memory 208 may be an internal or external large capacity device for storing computer processing instructions, computer-readable data, and the like. The storage capacity of the memory 208 is typically measured in megabytes or gigabytes. Examples of suitable device for memory 208 include any one or more of the following: a floppy disk in conjunction with a floppy disk drive, a hard disk drive, a CD-ROM disk and reader/writer, a DVD disk and reader/ writer, a ZIP disk and a ZIP drive of the type manufactured by IOmega Corp., and/or any other computer readable medium that may be encoded with processing instructions in a read-only or read-write format. Further functions of and available devices for memory 208 will be apparent.

The memory 208 preferably stores, inter alia, a plurality of programs 210 which may be any one or more of an operating system such as Windows XP system by Microsoft Corp, and one or more application programs, such as a web hosting program and a database management program of the type manufactured by Oracle Corp., each of which may be used in combination to implement various embodiments of the present invention.

The programs 210 may also include processing instructions for accomplishing two-way communications with user terminals 104a-104n, as described herein. Accordingly, the programs 210 may include hosting software, such as APACHE, that utilizes JAVASCRIPT, hyper-text mark-up language (HTML), extensible mark-up language (XML) and other similar programming languages typically used in conjunction with hard-wired or wireless network communication, systems. The web hosting software may further use known cryptographic techniques to accomplish secure communications, such as secure socket layer (SSL) communications, over network 100.

The programs 210 preferably also include a database management program, of the type commonly manufactured by Oracle Corp. to save, retrieve and analyze data in a database format that is stored and operated upon by the host servers 106.

The programs 210 may also include other applications, such as VISUAL BASIC, to allow an operator to program specific functionality performed by the host server 106, as described herein. The programs 210 described above cooperate to form a system which operates in the manner described with respect to FIGS. 5-7.

The memory 208 preferably also stores a plurality of relational, object-oriented or other types of databases Exemplary databases include the user database 300 that stores data pertaining to users of the present system, and the information database 400 that stores data relating to information objects generated by a plurality of such users. Particular examples of such databases are described below with respect to FIGS. 3 and 4, respectively In referring to the databases depicted therein, it should be apparent that the first row of the databases includes a field header describing each exemplary field of the database. Fields of data are represented by columns while each of the rows correspond to one exemplary record of the respective database. One of ordinary skill in the art will readily appreciate that further or fewer fields and records of data, or other combinations of the same, may be used. The databases 300 and 400 described herein may also be configured into any number of relational databases. Additional databases, not shown, may likewise be used with the present system to add additional functionality. In addition, configurations other than database formats may be used to store the data maintained in exemplary databases 300 and 400, such as spreadsheets formats, word processing formats, text-delimited files and the like.

Referring now to FIG. 3, an exemplary user database 300 is maintained by host server 106 to store user data that enables some of the functionality described herein for a personal relationship management system. Accordingly, the user database 300 may include a User Identifier field 302, a Password field 304, a User Name field 306, a Profile Information field 308, a Networking Club Associations field 310, an Associated Users field 312 and a User preferences field 314. The database 300 may be used in conjunction with exemplary processes described in detail with respect to FIGS. 5-7 below The User Identifier field 302 may be used to store a unique identifier corresponding to each user having an account with the online network 100. The identifier may be any alphabetic, numeric, alphanumeric, binary or other combination of characters that are sufficient to identify a particular user. In some embodiments, the identifier may be an e-mail address of the user or the like.

The Password field 304 contains a combination of characters that must be entered by the user in order to access the account. The password may be user-generated or assigned by the system. The password may be required to have a particular format and may be required to be changed periodically in order to insure that other users do not surreptitiously access the user's account.

The User Name field 306 may contain an actual given name of the user The user name may be used for reference when communications between the operator of the system and the user are initiated. The user name may also be transmitted in communications between the user and other users of the online network 100.

The Profile Information field 308 may contain references to entries in the information database 400 such as contact information, employment in formation, educational information, personal interest information and the like of the user. Information for this field may be collected from a user upon an initial entry into the system and may be updated and extended over time information in this field 308 may be used and reported when other associated members conduct profile searches or request dossiers on the system.

The Networking Club Associations field 310 stores an indication of any networking clubs to which the user belongs. The information in this field 310 may be used to generate group directories that the users enrolled in the networking club may access in order to readily facilitate communications and associations.

The Associated Users field 312 stores an indication of all particular users with whom the subject user has completed a handshake with. This field may further be used to store the association level assigned to the user.

The User Preferences field 314 stores each user's preferences for receiving information. The preferences may correspond to the ordering, formatting, and structuring instructions as well as any further customizable or default preference, such as automated document delivery instructions, associated with the user's account.

Other exemplary fields may be present in user database 300, such as a field (not shown) for storing an identification, e.g. an IP address, of the remote server 106 through which the user accesses the present system. Information from such a field thus enables a plurality of remote data stores to identify and cooperatively transfer information over the online network 100.

The relationship management system, as stated previously, is operable to allow a user to disseminate personal information and the like to associated users. The information entered by each user is stored as an information object, with the text and characteristics of the information object being maintained in an information database 400, discussed immediately below.

The information object is a persistent data structure having two kinds of fields: fixed and editable. The fixed fields may store the author of the object, e.g., the user who created it, and the dates of creation/editing of the object. There are a variety of editable fields, as described below, with the exact number depending on the type of object and the amount of information desired to be stored.

In order to create an information object, a user must first select a type of object from a set of object types defined by the personal relationship management system Exemplary object types include a "news" object in which the user may enter personal news; a "recommendation" object in which a user provides a recommendation for a movie, a restaurant, a book, and the like; a "referral" object in which a referral of a person or company is provided. Various other types of objects are possible and may be provided at the discretion of the operator of the personal management system, as should be readily appreciated.

In some embodiments, the host server 106 may provide a publication web page through which a user may select any available object types A plurality of hyperlinks may be provided, with each hyperlink assigned to a web page template corresponding to the described object type. Upon selection of a hyperlink, the corresponding template is presented having a plurality of fields into which the user may enter information. The fields therein each correspond to one of the database fields for information objects described below with respect to FIG. 4. Certain fields of the template may allow the entry of text by the user, while others may have checkboxes of predetermined data that are selectable by a user. Users may also choose to leave certain fields of the template empty.

In some embodiments, the user may be provided with short-cuts by which certain fields are automatically filled with pre-stored information by the host server 16 The user, therefore, only needs to fill in the remaining desired information. For example, one contemplated short-cut may be developed for a "new project" information object. Selection of this short-cut would create an object of the type "project" in which the fields for the organization, department, and location associated project can be pre-filled by data entered by the user for a previous project. If the user is still associated with such organization, department, and location, this information does not need to be changed. Other uses for short-cuts will be readily apparent.

Referring now to FIG. 4, an exemplary information database 400 is maintained by host server 106 to store and manage information objects generated by users of the present system. Accordingly, the information database 400 may include a User Identifier field 302, an Information Type field 404, an Information Text field 406, an Access Rights field 408, an Excluded Members field 410, an Included Members field 412 and a Date Created field 414. The information database 400 may be used in conjunction with the exemplary processes described with respect to FIGS. 5-7 below The Information type field 404 may store information about the type of object created or edited by a user Exemplary information types include "profile," "personal news," referral, and "recommendation."

The Information Text field 406 contains the body of the information object. The subject matter stored in this field 406 may be searched by associated users and/or published in an automated document generation process or dossier.

According to one embodiment of the system, even among connected users, information of one user is only accessible to another if the second user has been granted access rights, thereby forming an association with the user providing the information. A further aspect of some embodiments of the present invention is the simple and flexible manner in which access rights are granted and/or changed.

For each user, the personal relationship management system maintains a list of users who form associations. In some embodiments, the system provides a web page showing a list of all associated users and the access level they have been granted. Checkboxes are provided to remove the user from being associated, or for changing the user's default access rights level.

The system provides default associations, such as "close friend," "colleague," and "acquaintance." The system also allows users to create custom association levels with whatever name is desired. A user who creates a custom association level may assign any number of connected users to this association level. In some embodiments, upon creation of an object, a list of default and custom association groups may be presented to the user on a web page including checkboxes next to each selectable access rights option. The user may then select one or more default associations, one or more custom associations, as well as any included or excluded users. All designated users will then receive the information object upon their next login, unless personal filters established by the user prevent the reception of such information. The checkbox designations provided for each information object provide flexibility in choosing how to disseminate information that is not present in existing technologies. Furthermore, certain types of information objects may have default association levels that are editable by the user.

It should be noted that, in some embodiments, two associated users need not share the same association level. For example, a first user may assign a second user as a colleague, while the second user may assign the first user as a close friend. The association level assigned to a user by another may not become known to that user.

Users may additionally form networking clubs which are separate from access rights. Users may form such clubs based on common interests or projects that are shared by certain users, For example, a software development department may agree to form a product development club within the online network 100.

To create a networking club, a user may enter the identifier of each user to be included in the club. In some embodiments, the system accepts this information in a file that can be uploaded via a web form Alternatively, the information may be entered directly through a template. The creator of the club may add or delete members through a series of checkboxes that are presented with each user name in the networking club directory. The inclusion of a user in a group may or may not result in all users of that group becoming associated. That is, members of the club may not necessarily become associated members.

The system may provide a user with a list of each club in which she is a member. An example of such a list 820 of networking clubs is presented in FIG. 8H. The list may be provide as a list box on a web page presented to the user. The user may then extend an invitation to any members of the club that are not associated members. This facilitates the ability of users to or associations with previously unknown contacts.

In accordance with the foregoing, the Access Rights field 408 of FIG. 4 may be used to store the access rights selected by the authoring user for the object, including default or custom association levels. The Excluded Members field 410 may store an indication of associated users that are not to receive the information, even though their access rights may permit. The Included Members field 412 may store an indication of associated users that may receive the information even if their associated access rights do not correspond to the access rights level of the information object.

The Date Created field 414 may store an indication of the date that the object was created or edited. The information in this field may be used to calculate an age of the information object that the system, in turn, may use to determine whether to include the object in an automatic document generation process.

Other fields may be incorporated into information database A such as a field for storing further information object data, such as a field for storing a headline or teaser line of a news object authored by a user. In general, the fields of the information database 400 will correspond to fields in a template for the user that is used to enter text information for the information object.

In some embodiments, for example, a user may create a personal news object. The news object may have additional fields (not shown) for storing a headline, a teaser line of the information object. The body of the news object may be stored in the information text field 406 described above.

Figure 5:
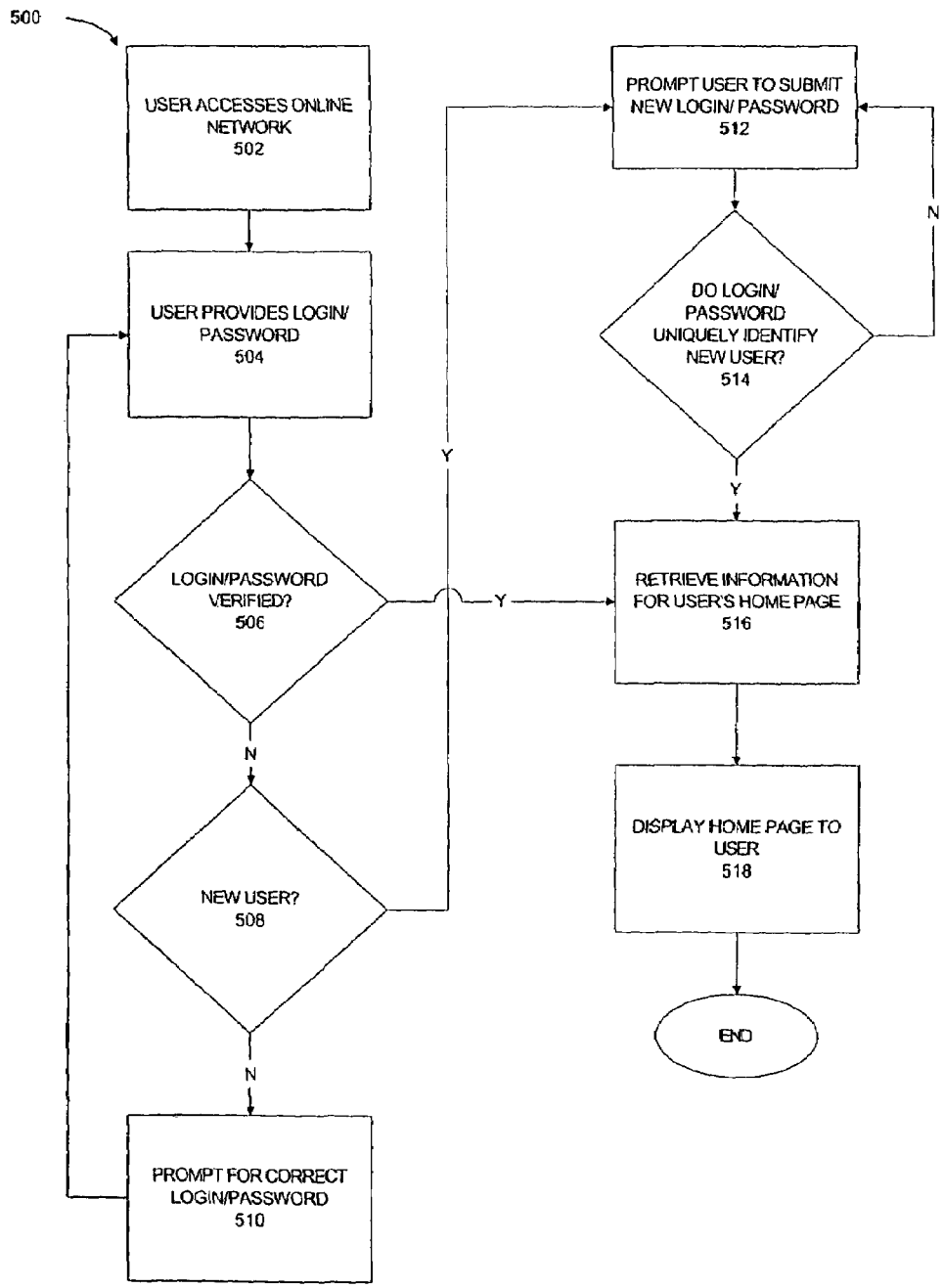
FIG. 5 is a flowchart depicting an exemplary enrollment process performed by a member over the network of FIG. 1.

Turning now to FIG. 5, therein is depicted an exemplary login process 500 performed by a user of the online network 100. The login process 500 commences when a user accesses the host server 106 of the online network 100 (step 502). The user provides a login identifier and password (step 504) through a home page of the online community. An exemplary login identifier is a user's e-mail address.

In response to the entry of login/password information, the system determines whether the login and password correspond to an existing account with the online network 100 (step 506). If so, the process 500 continues to step 516 below. Otherwise the process 500 continues at step 508.

At step 508, the system determines whether the user is a new user. The system may determine that the user is new if the login identifier entered by the user does not correspond to an existing login identifier stored, for example, in field 302 of user database 300. In such case, the process continues at step 512, below. The system, however, may determine that the user is not a new user, such as by detecting a cookie acknowledging the users status and stored by the system on the user's terminal 104*a*, or if the login identifier entered by the user matches information in field 302. If the user is not a new user, the process 500 continues at step 510 below.

At step 510, the system prompts the user to enter correct login/password information, after which the process 500 returns to step 504 above At step 512, the system prompts the user to submit new login/password information and the process continues to step 514 below.

At step 514, the system determines whether the login/password entered by the new user uniquely identifies that user. This may be determined by referencing field 302. If the user is uniquely identified, the process 500 continues to step 516, below. Otherwise, the user is returned to step 512 to enter a new login/password.

Figure 8A:
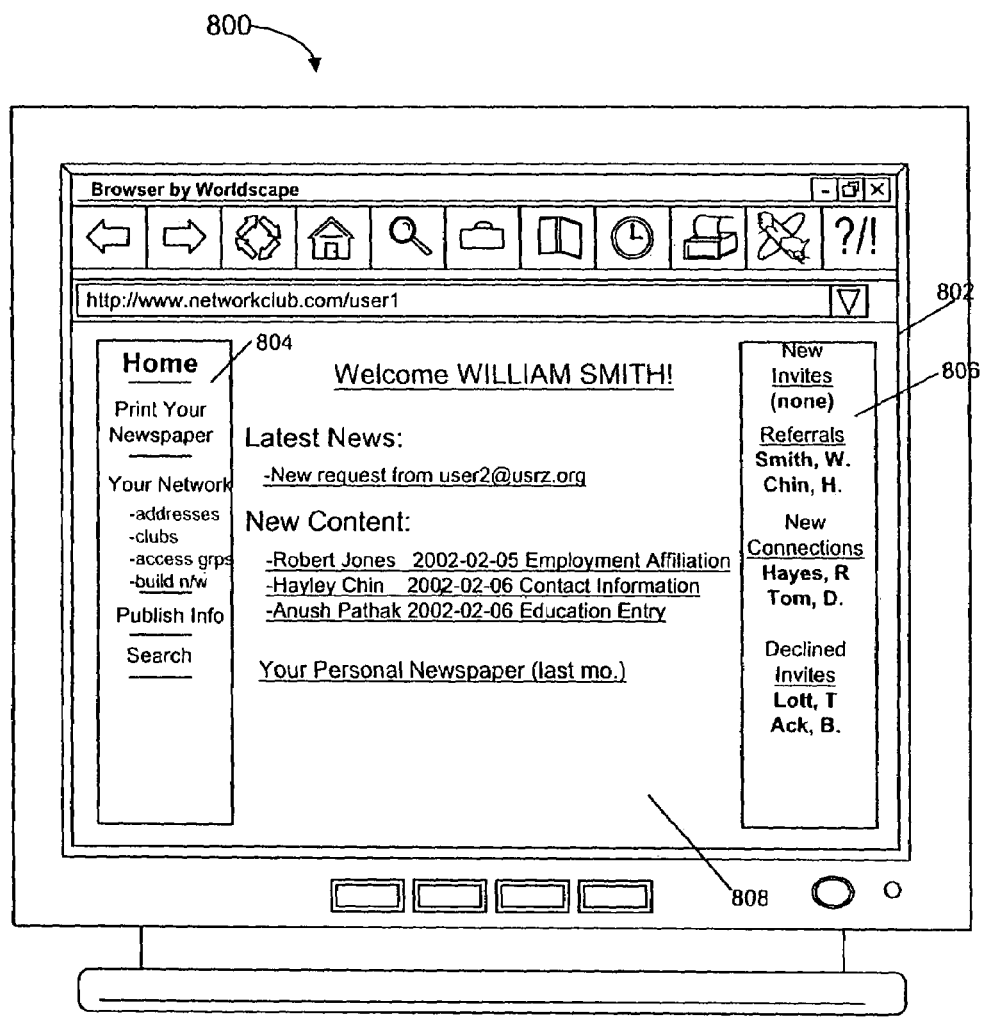
FIGS. 8A-8H are screen shots of exemplary web site pages according to certain embodiments.

At step 516, upon entry of a unique login/password, the system retrieves information for the user's home page. The home page information may include an automated newspaper document containing information objects presented by associated users (step 518). An example of such newspaper document is provided in FIG. 8B. The home page may further list any pending invitations to associate with other users or to join a networking club A directory of associated users may further be presented (see, e.g., FIG. 8C), The user home page (an example of which is depicted in FIG. 8A) may also include other selectable hyperlinks, such as for generating an information object, performing a search of information objects or contact profile information, changing user preferences, and the like. Examples of such selectable options are presented in FIG. 8D. Upon successful login, the process 500 ends.

An advantageous aspect of some embodiments of the present invention is that no information can be exchanged between two users unless they have both initially agreed to allow such information to he exchanged The relationship management System therefore (1) prevents users from learning private information about other users without permission, and (2) prevents users from "spamming" other users with unsolicited information.

The agreement is made through a virtual handshake, mentioned above. To accomplish the handshake, a first user transmits his login identifier to a second user, who may not be part of the online network 100. The identifier may be transmitted, for example, by e-mail to the second user, or may be communicated in some other form, such as by telephone, a writing, or in-person communication.

In the case where the second user is not a member of the online network 100, the invitation to join may be transmitted to the second user by an e-mail having, for example, a selectable hyperlink embedded therein The second user may reply, for example, by selecting the hyperlink in the e-mail message that, in turn, opens a web page through which the second user may input information sufficient to establish an account in the online network 100.

In the case where the second user is already a member of the online network 100, but not associate with the first user, the personal management system may provide a hyperlink in the second user's homepage, the selection of which will result in an acceptance of the first user's invitation to become associated.

Furthermore, the personal relationship management system is contemplated to allow users hosted on different servers 106 to complete a remote handshake. The remote handshaking process is virtually identical to a local handshake process where both parties are hosted on the same server, In the case of a remote handshake, when the handshake is requested by the first user, that user's host server 106 uses UHR, described above, to determine the host of the other user. If the UHR indicates that a remote server 106 for the second user, the local server 106 dispatches a message to the remote server requesting the handshake. The remote server receives this request at a communications daemon and adds it to an internal database. When the second user accepts or declines a handshake, the remote server sends a corresponding message back to the local server. The local server receives the response at its communications daemon and forwards an indication of the second user's response to the first user upon login by the latter.

Once the virtual handshake is complete, the users may select an association level for the other. Then, either the first or second user may make information available to the other through the online network 100. Either user may further terminate the association at any time, which will prevent further information from being distributed therebetween.

Figure 6A:
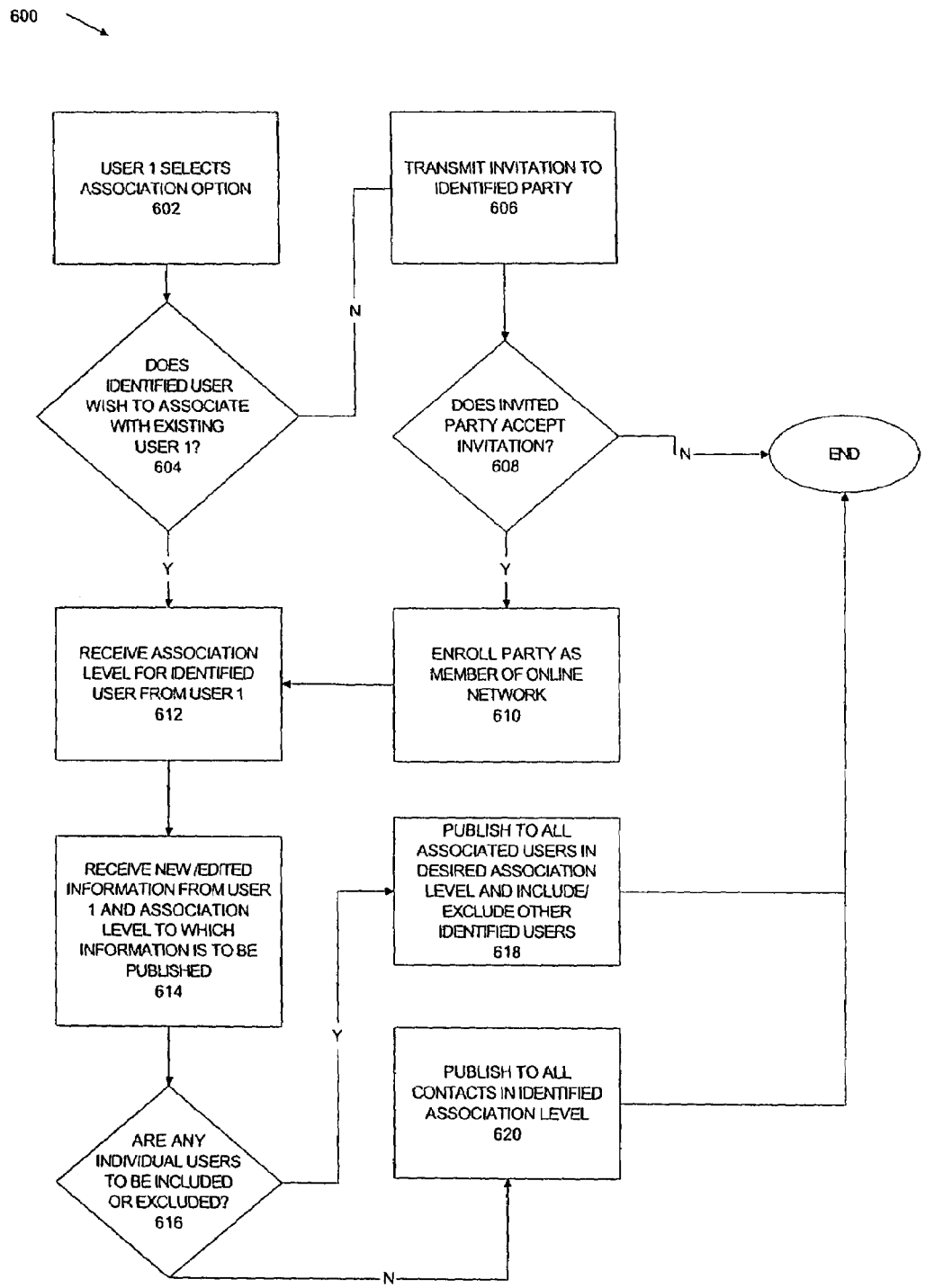
FIG. 6A is a flowchart depicting a first exemplary publication process performed by a member over the network of FIG. 1.
Figure 6B:
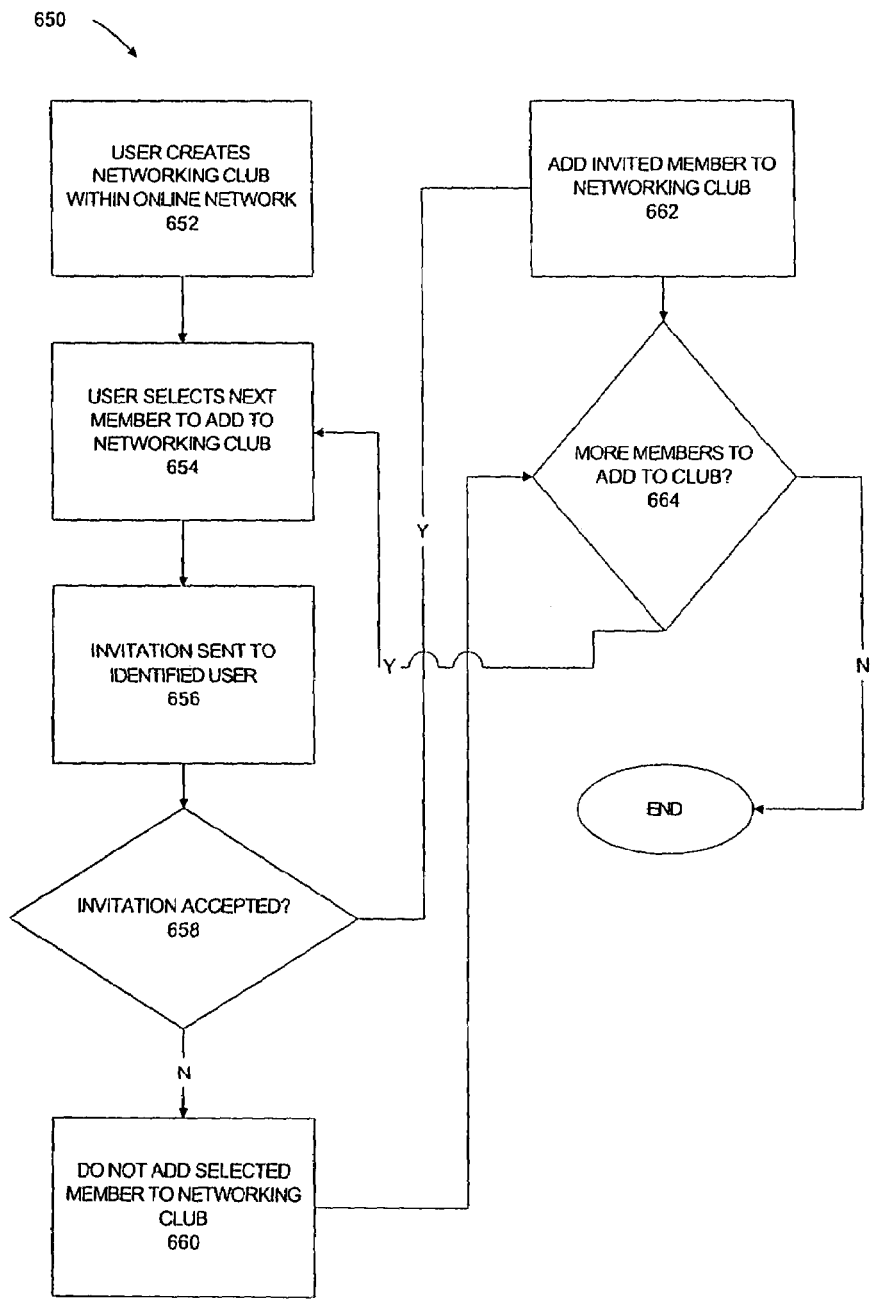
FIG. 6B is a flowchart depicting a second exemplary publication process performed by a member over the network of FIG. 1.

Turning now to FIG. 6A, therein is depicted an exemplary process 600 performed by a user of the online network 100 for inviting a new member to the network and publishing information to selected association members.

The process 600 commences when a user selects an association option provided by the host server 106 (step 602). The system then determines whether the user wishes to associate with an existing user or a new user (stop 604) This can be prompted by explicitly inquiring of the user whether the invited party is a member of the online network 100. Alternatively, the system may receive a login identifier of the invited party and search field 302 to determine whether there is a match. If an existing user is to be associated, the process 600 continues to step 612 below. Otherwise, the process 600 continues to step 606

At step 606, the server transmits an invitation to join the online network 100 to the party identified in step 604 The system then determines whether the invited party accepts the invitation (step 608). The invitation may be deemed accepted when the invited party transmits a reply to the invitation. If the invitation is accepted, the parties are now referenced as "associated" or "having an association" and the party becomes listed as a member of the online network 100 (step 610). This may be accomplished by storing an identification of the invited party in field 312 of the record corresponding to the user who sent the invitation.

The user who transmitted the invitation may then assign an association level for the invited contact (step 612). This information may also be stored in field 312 with the invited party's login identifier. The association level may be changed at the discretion of the user who transmitted the invitation.

Next, the user enters new or edited information objects that are to be published (step 614). The system may store the objects in Information database 400

In some embodiments, a user may edit or update a previous information object. The object may be edited by selecting the object from a list of created objects that may be presented to the user as a series of available hyperlinks on a publications web page If a hyperlink for an existing object is selected, the user may be presented with the same template used to enter the information originally. However, the previously-entered information will be shown within the fields of the template The user may alter the information, including the association level of the information, and re-save the information object to the information database 400. Updates to existing objects are immediate, so dynamically generated documents always include the latest information.

The system then determines whether the authoring user has designated any parties that are specifically included or excluded from receiving the information object (step 616). The system may make this determination by examining fields 410 and 412, which include information entered by the authoring user from an object generating web template. If any individual members are to be included or excluded, the process 600 continues to step 618 Otherwise the process 600 continues to step 620.

At step 618, the system publishes the information object to all users in the identified association level(s) and includes/excludes any selected users, after which the process 600 ends.

At step 620, if there are no specifically included or excluded members identified, the system publishes the information object to all contacts in the identified association level without including or excluding specific members, after which the process 600 ends.

In this process 600, users with proper access rights can view the information objects of users with whom they are associated. The personal relationship management system organizes these objects into useful dynamically-generated documents and may present them in a newspaper-like format. The format may include columns, with object titles presented as a headline to each information object and a byline indicating the user creating the object Each object may further presented with a date of creation or last edit. An example of one contemplated newspaper-like format is provided in accompanying FIG. 8B.

In some embodiments, the newspaper is available through a hyperlink on the home page of user after a login into the online network 100. Upon selection of the hyperlink, the user may be presented with all objects designated for the user's association level from any associated users. The newspaper may be limited to those objects created within a predetermined period of time, for example, the previous two weeks. The information presented will also depend on the filter criteria established by the receiving user in user preferences field 314.

As stated previously, the preference filter allows the user to exclude, or give priority to, objects created by a designated user and objects of a particular information type. In some embodiments, a user may parameterize the filter through a web page that offers a list of all associated users and all types of information. Each item on the list has a selectable checkbox and a list box with a selectable range of numbers associated for each (e.g., 1 to 5). The checkbox allows the user to indicate that items of a particular type are to be excluded. The list box indicates a priority to be given to particular object types, for example, an item marked "1" will be of higher priority than an item marked "5."

The newspaper template includes ordering instructions, layout instructions, and formatting instructions. The ordering instructions may operate in the following manner. First, the priorities of objects defined by a receiving user are used to give an initial ordering to the available objects. It should be understood that since all objects are associated with an owner and a type, and a user assigns a priority to each owner and each type, the priority may be determined by the function $F(p_0, p_1)=p_0*p_1$, where $p_0$ is the priority assigned to the owner and $p_1$ is the priority assigned to the object type. Second, the objects may be ordered only by object type, based on the priorities assigned to each object type only.

The system may choose the final order of objects in the newspaper by choosing articles from the first ordering above and applying the layout and formatting instructions designated by the user until the first page of the newspaper is full. A second type of ordering may be used for second and subsequent pages of the newspaper.

The layout instructions may designate that headlines are followed by teaser lines and then body text. Other layouts may likewise be selected.

The formatting instructions follow conventions for graphical layout of a newspaper, and map them to an online format, such as HTML or XML, and a print quality format, such as PDF.

Once an object is created it may be stored on the host server of the author of the object. If the object is distributed to other users on other host servers, each host server may save a copy of the object locally, to conserve routing of information between servers. The stored object will be recalled when needed by a user from the local copy, unless the system stores an indication that the object has been changed Turning now to FIG. 6B, therein is depicted an exemplary process 650 performed by a user of the online network 100 for inviting a new member to a networking club within the online network 100 and publishing information to the members of the networking club. The process 650 commences when a user creates a networking club within the online network 100 (step 652). This may be accomplished by selecting an appropriate hyperlink from the user's home page that calls a web template having fields of data to be completed by the user in order to form the networking club. Any club affiliations can be stored in field 310 of the user database 300.

Next, the user selects a party to add to the networking club (step 654). The host server 106 sends an invitation to the identified party to join the networking club (step 656)

The host server then determines whether the invitation is accepted (step 658). This step may be performed in a manner similar to step 608, described above with respect to FIG. 6A. If the invitation is accepted, the process 650 continues to step 662. Otherwise, the process continues to step 660.

If the invitation is declined, the host server 106 does not add the invited party to the networking club (step 660) The process 650 then continues to step 664 below. If, however, the invitation is accepted, the invited member is added to the networking club (step 662)

At step 664, the system determines whether there are more members to add to the networking club This may be accomplished by prompting such information from the user. If there are more parties to invite, the process 650 returns to step 654 above. Otherwise the process ends.

Another aspect of some embodiments of the present system is that a user may restrictively search the underlying user database 300 for associated users and for contacts of associated users. The system will readily report matching search information, such as type of college degree earned, current residence, past employer, and the like, for any associated users of the user performing the search. The system offers this search capability through an intermediate programming layer between the database and the remaining layers of the system. This search layer provides a general interface through which a search request may be entered. First the system limits any search request to the information available from all associated members of the user. This prevents a user from receiving information about users with which she is not associated. This also limits the allocation of processing power required for the host server 106 to perform and complete a search. The association of each user may be checked and confirmed by the system prior to their inclusion in the search results. However, it is further contemplated that the system may allow a user to search any the contacts of all her associated users as well. Such an extended search, however, may be safeguarded by requiring the associated user to approve the release of any contact in formation for a user that is not associated with the user performing the search In order to initiate a search, a selectable search hyperlink may be presented to the user on a web page. The web page includes a text box where desired information may be entered. This information becomes the search request. An example of a search template is provided in FIG. 8E. Different web pages may be presented depending on the type of information to be searched. The request from the user may be required to be in a database-recognizable format, such as Structured Query Language (SQL). The search engine then reviews the information of associated users to find matching text. The results of the search may then be presented to a user in an automated search result document listing the information and the corresponding user that matches the search request (see, e.g., FIG. 8F).

One type of search that may be performed is a profile search. The education, work experience and the like of associated users may be searched and presented in an automated document referred to herein as a dossier. An example of a dossier is presented in FIG. 8G.

The dossier template may include separate ordering, layout and formatting preferences from other object types.

Searches initiated by users may require information from distributed host servers 106. When a search is requested, if the local server of the user submitting the request determines that information is required from remote servers, the local server may invoke a UHR process, as described above, to determine the servers hosting any associated user of the requesting user. The local server may then authenticate itself to each remote server as necessary. The query is then forwarded to each such remote server These remote servers then return results responsive to the query to the local server, which prepares the display of the search results to the user.

Figure 7:
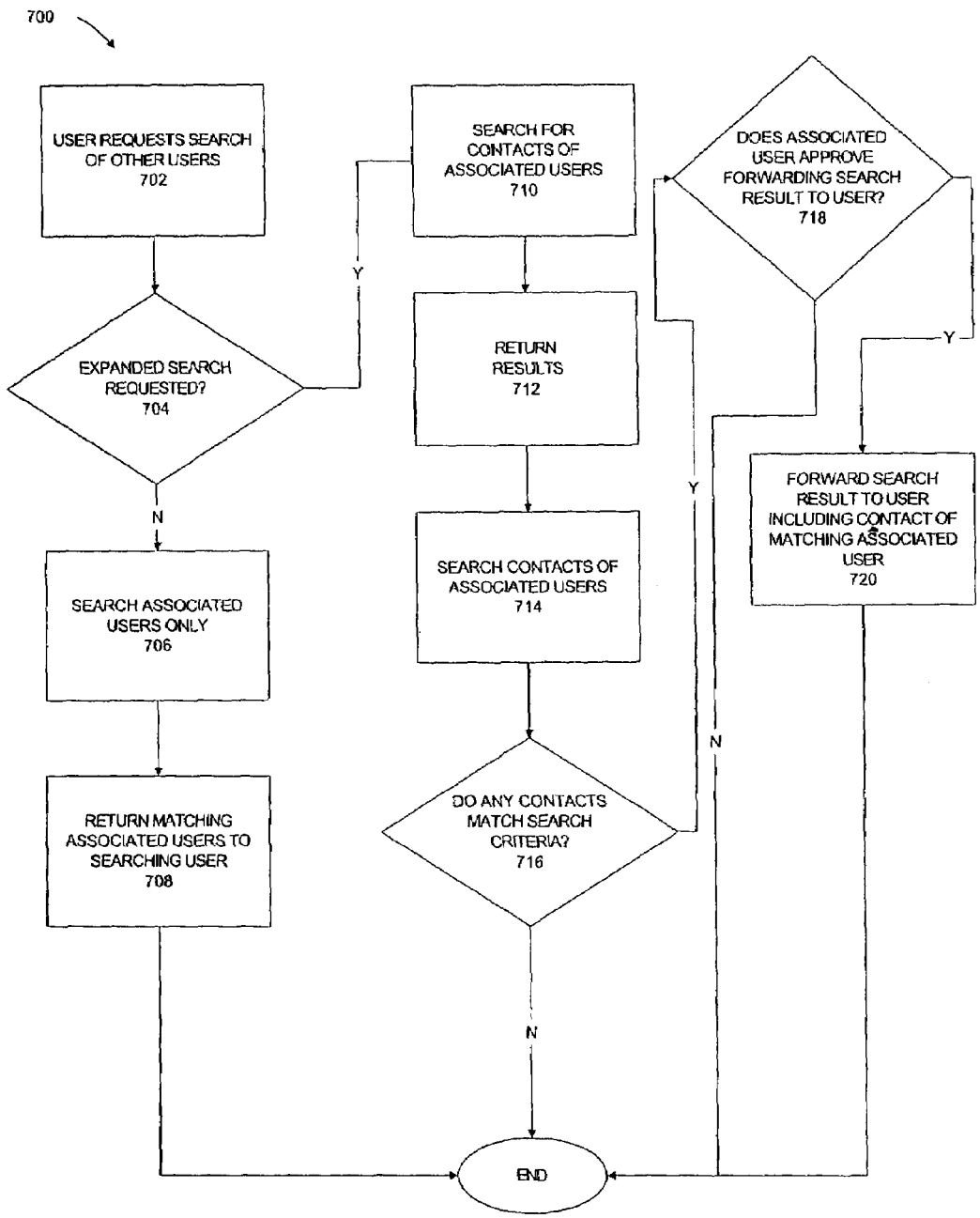
FIG. 7 is a flowchart depicting an exemplary search process performed by the member over the network of FIG. 1.

Turning now to FIG. 7, therein is depicted an exemplary search process 700 performed by a user. The process 700 commences with a request by a user to search profile information of other users of the online network (step 702). The system determines whether the request is an expanded search request (step 704). That is, the system determines whether the searching user wishes to search associated users, and additionally search any contacts of their associated users If so, the process 700 continues to step 710 below. Otherwise the process 700 continues directly to step 706

The system next searches the records of databases 300 and 400 corresponding to associated users (step 706). Any matching subject matter is then identified to the user requesting the search (step 708), after which the process 700 ends.

If an extended search has been requested, the system searches all contacts of associated users of the searching user (step 710) and returns results from this search to the searching user (step 712).

The expanded search then continues for such contacts of each of the searching user's associated users (step 714). Pursuant to some embodiments of the present invention, some of these contacts may not have an association with the searching user. The system determines whether any of these contacts match the search request (step 716). If so, the process 700 continues to step 718. If no contacts match the search request, the process 700 then ends.

If a contact of an associated user matches the searching user's request, and if the contact is not associated with the searching user, the system will require approval of the release of such information from the associated user having the contact, or, in some embodiments, from the contact itself. If the release of information to the searching user has been approved (as determined in step 718), the process 700 continues to step 720. Otherwise the process 700 ends At step 720 the system presents the search results including contacts of associated members where the release of such information has been approved (step 720), after which the process 700 ends In certain embodiments, the present system enables personal relationships to be more readily maintained online while enforcing secure access rights of each user. Advantageously, users may receive information objects from associated members in customizable formats. The information objects may contain any type of personal information including, but not limited to, job searches, openings of job positions, family events, recommendations for entertainment (i.c. books, movies) and dining, and even as a search tool for dating. The services described herein may be subsidized by the use of advertising, by the imposition of periodic or one-time membership fees on users, or a combination of the same.

Reference is now made to FIGS. 8A-8H where a number of user screens are depicted on a screen 800 showing various user interfaces which may be used in conjunction with some embodiments of the present invention. FIG. 8A is an exemplary home page for a particular user and includes a navigation screen 804 presenting navigation options, an invitation screen 806 presenting various invitation options (such as, for example, new invitations from other users, referrals from existing contacts, accepted invitations, and declined invitations), and a primary information screen 808 presenting personalized information (such as, for example, the latest news for the user, new content, etc.).

Figure 8B:
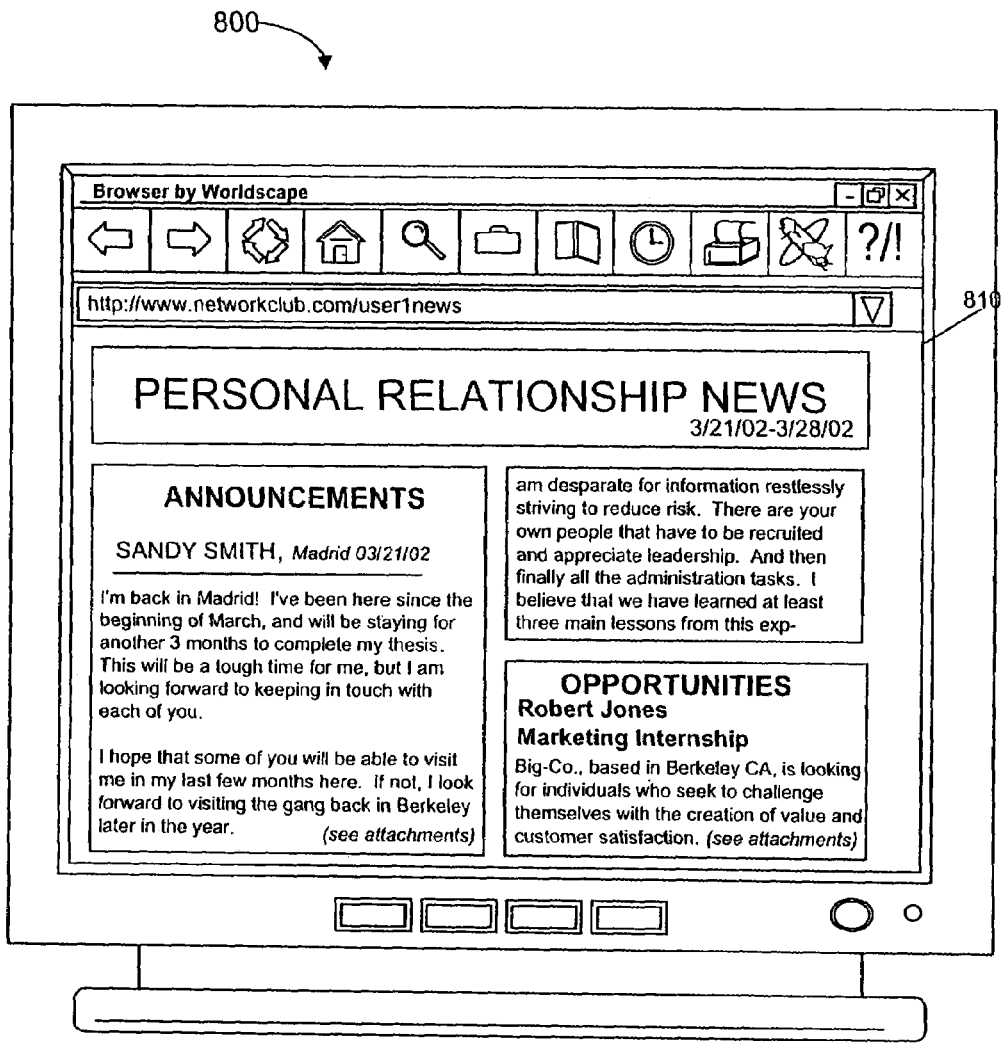
Figure 8C:
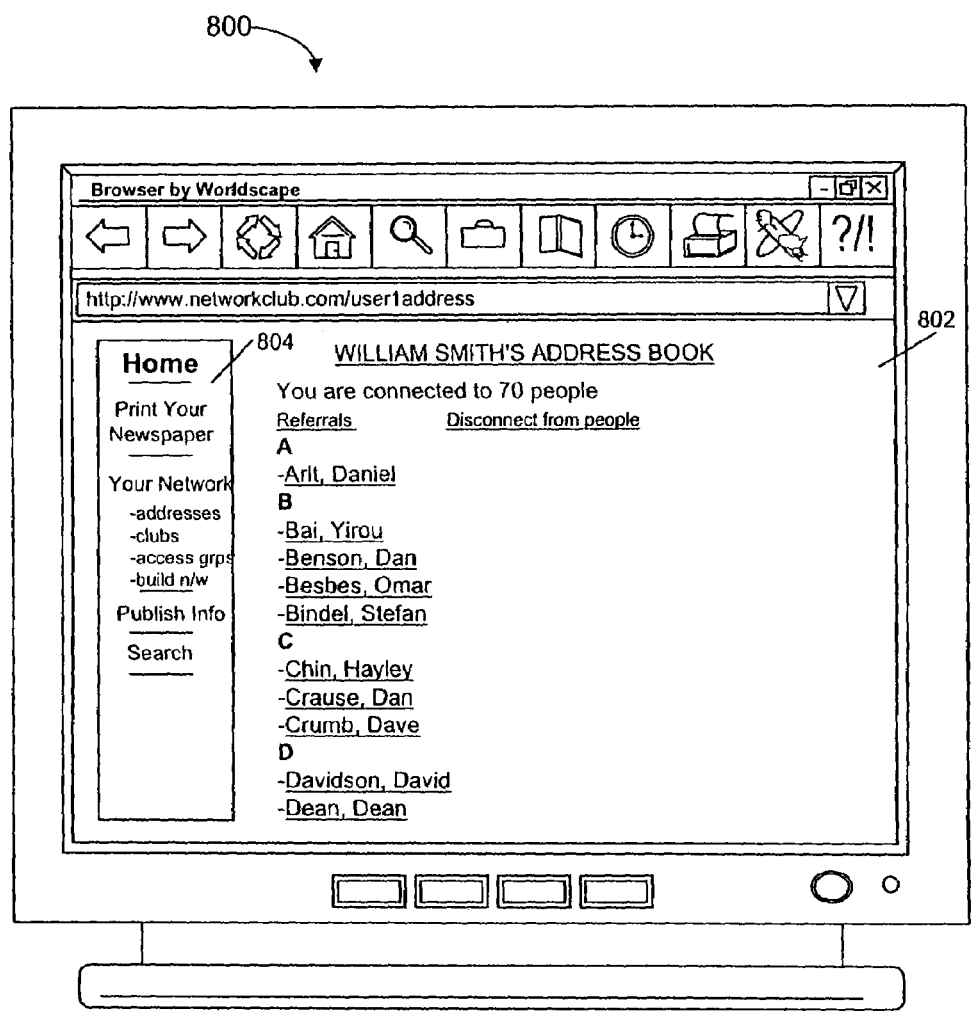
Figure 8D:
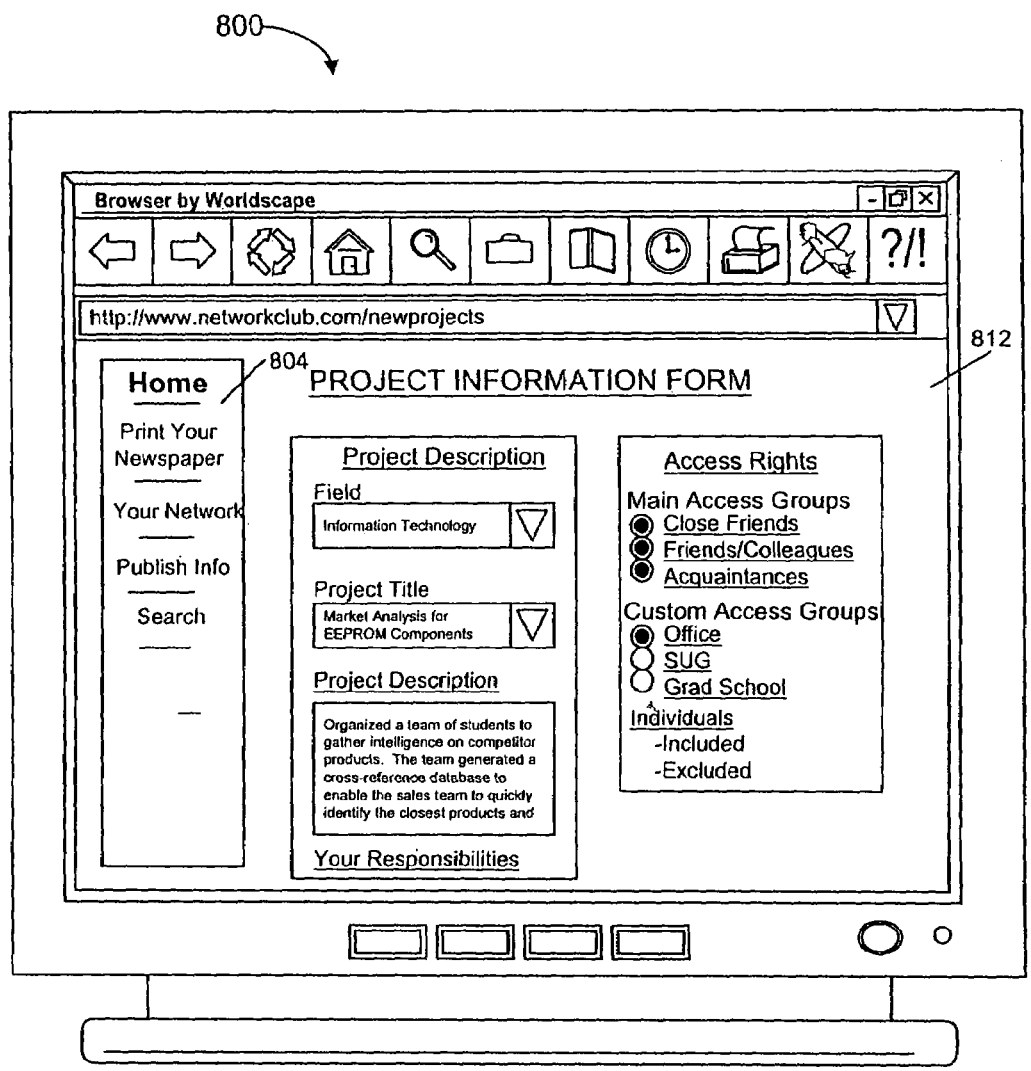
Figure 8E:
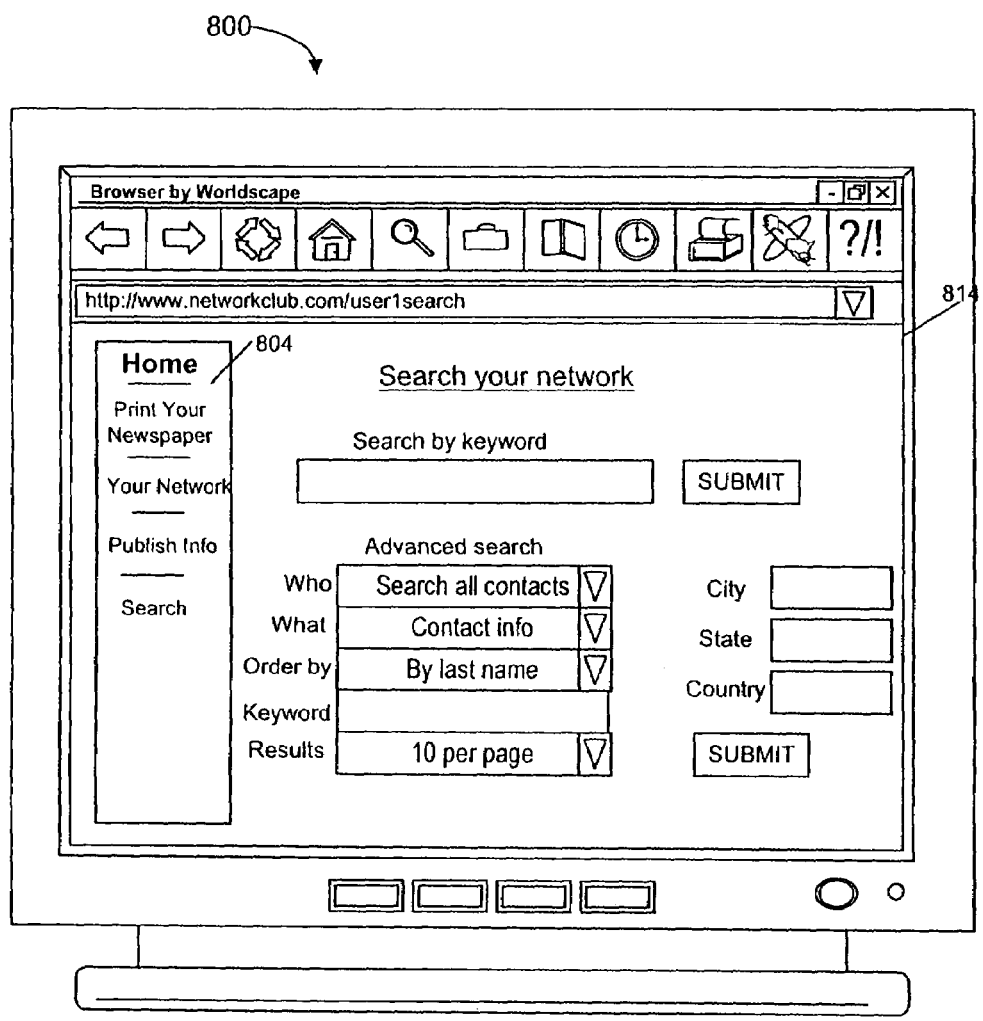

FIG. 8B is an exemplary screen depicting an example newspaper display 810 for a particular user FIG. 8C is an exemplary screen depicting an exemplary address book display for a particular user. In some embodiments, the contact's name may be used to directly access a dossier of information about the contact. FIG. 8D is an exemplary screen depicting a project information form 812 In the example form depicted, information is being entered for a category referred to as "Projects". Access rights for other users and groups may be easily established by selecting one or more groups (e.g., including one or more "main" access groups and "custom" access groups) or selected individuals FIG. 8E is an exemplary screen depicting an exemplary search form which may be used by a particular user to search information in his or her network. As depicted, various search tools and criteria may be utilized to quickly and accurately access information.

Figure 8F:
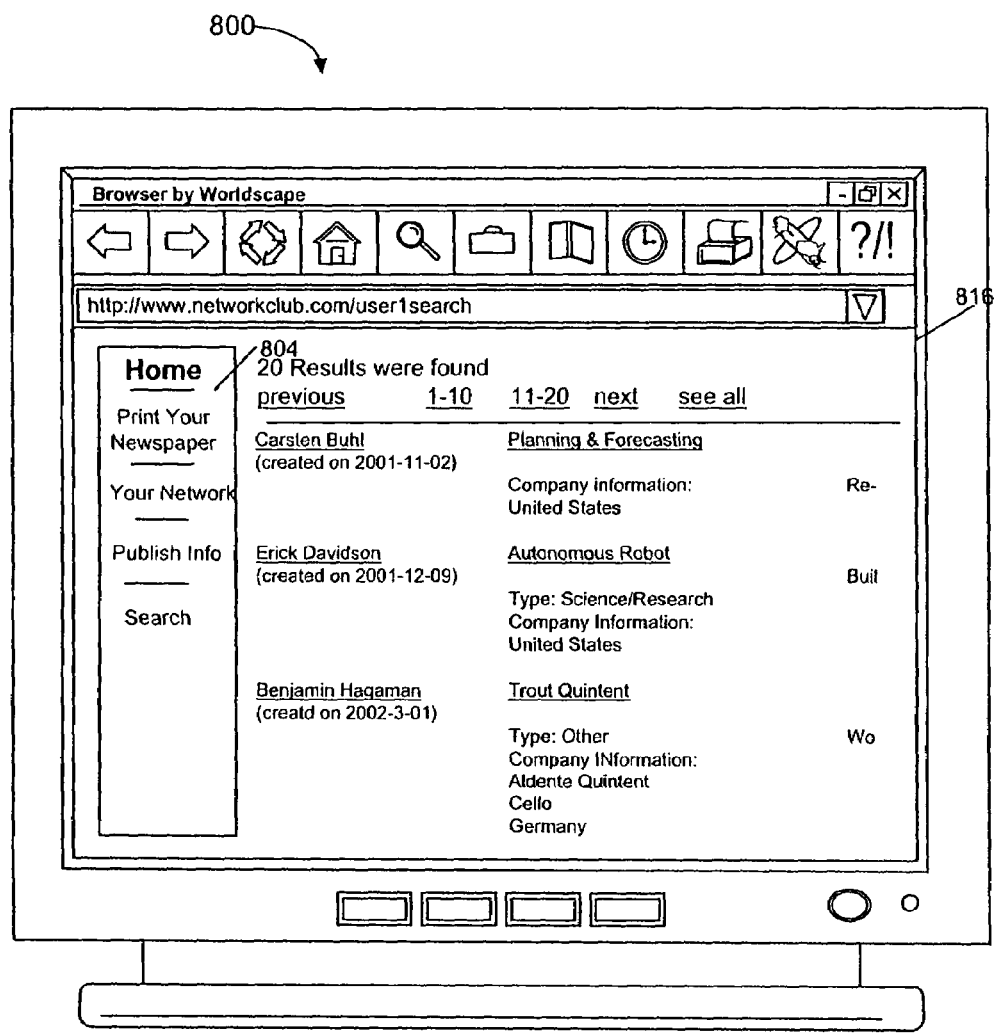
Figure 8G:
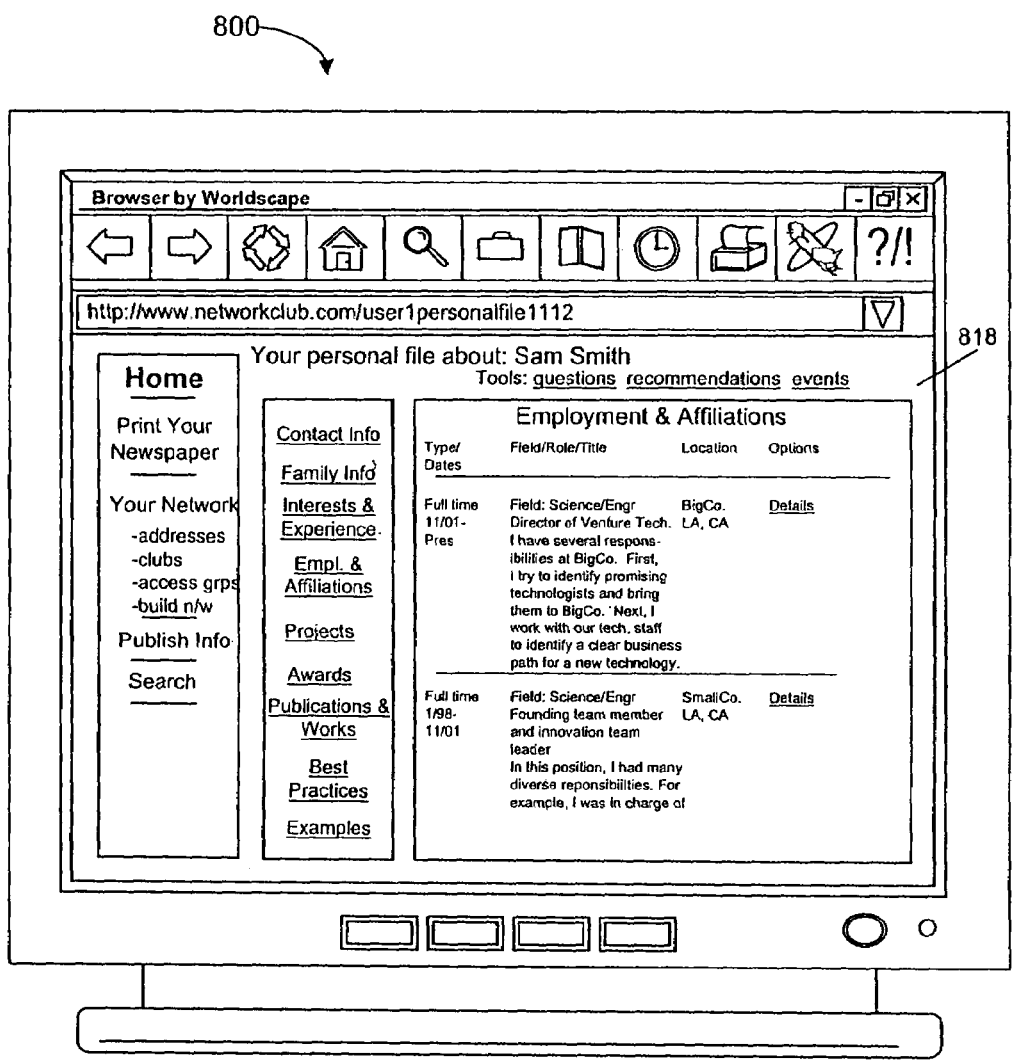
Figure 8H:
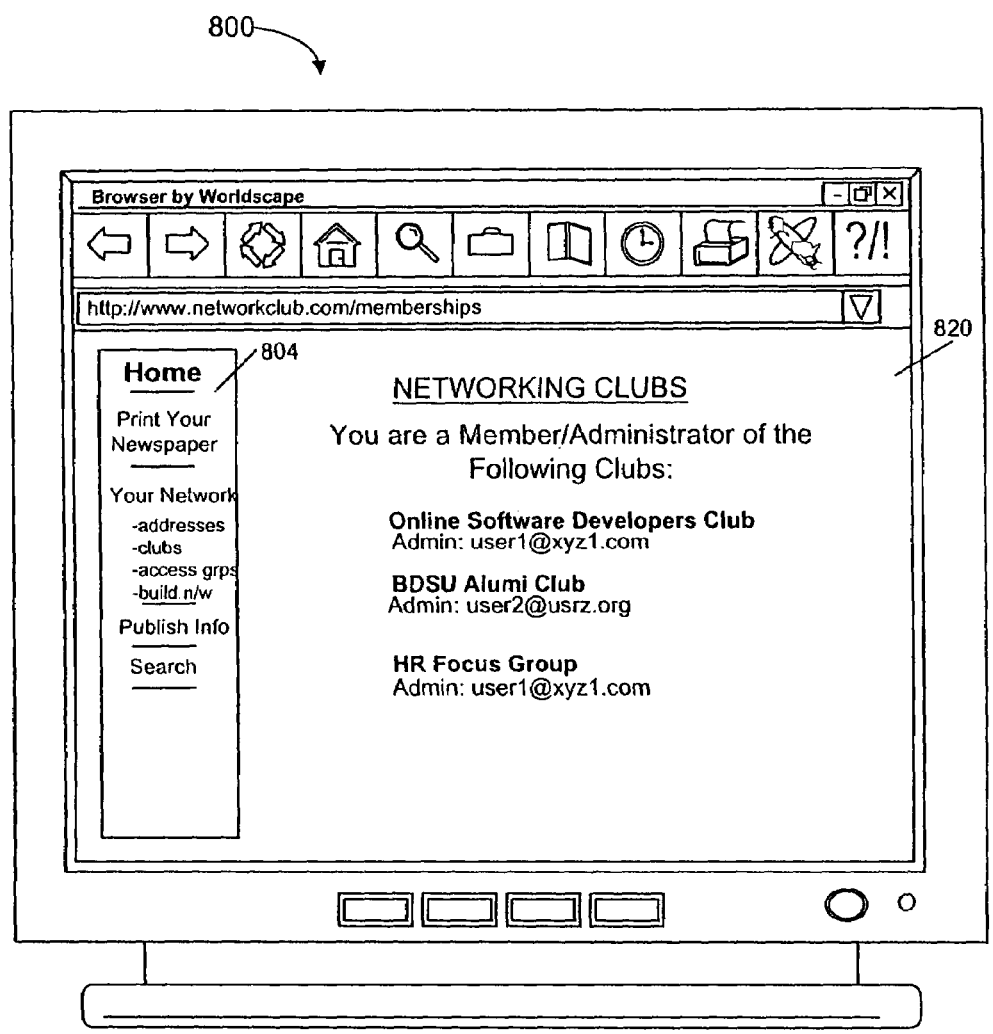

FIG. 8F is an exemplary screen depicting the results 816 of an example search and the types of data that may be quickly retrieved and presented. According to some embodiments, other users may be quickly contacted via e-mail by clicking on the user's name. FIG. 8G is an exemplary screen depicting information 818 a particular user has about another user. Various tool bars may be provided to allow quick access and management of data regarding the other user. For example, as depicted, information is display regarding the "Employment & Affiliations" of "Sam Smith". The exemplary user screens of FIGS. 8A-H are provided for illustration purposes only; those skilled in the art will appreciate that other screen layouts and formats may also be utilized.

Although the system has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A method for managing the sharing of personal information among a plurality of users of an online relationship management system, the method comprising the steps of:
   receiving, from a first user of said plurality of users, an identification of a second user of said plurality of users and an assignment of a second user information access right level for said second user and receiving, from the second user, an identification of the first user;
   associating said second user with said first user responsive to receipt of the identification of said second user from said first user, the identification of said first user from said second user, and the second user information access right level from said first user;
   receiving, from said first user, first information having a first information access right after associating said second user with said first user, wherein said first information is to be entered into at least one input template of said online relationship management system to provide first structured information automatically generated from at least one output template based on said first information; transmitting, to said second user, said first information if said second user has provided the first user identification and the first information access right is consistent with the second user information access right level;
   receiving, from said first user, second information having a second information access right, wherein said second information is to be entered into said at least one input template of said online relationship management system; and
   not allowing transmission, to said second user, of said second information if the second user information access right level is inconsistent with said second information access right.

2. The method of claim 1, wherein said at least one output template comprises a newspaper-like template, a dossier-type template, and/or a customized template.

3. The method of claim 2, wherein said online relationship management system automatically generates said first and second structured information from said at least one output template selectable by said first user.

4. The method of claim 3, wherein said online relationship management system sorts information objects by type and priority and converts text from said information objects to formatted articles automatically laid out in newspaper-like form.

5. The method of claim 3, wherein said online relationship management system selects information objects by creation date and by access rights.

6. The method of claim 3, wherein said online relationship management system selects or sorts information objections based on customized selections or sorting by said first user.

7. The method of claim 3, wherein said online relationship management system sorts information objects by type and creation date and converts text from said information objects to formatted text automatically laid out in resume-like form.

8. The method of claim 2, wherein said online relationship management system also provides a publishing center for said first user to enter first and second information and assign information access rights.

9. The method of claim 1, further comprising the step of enabling a search engine to permit said second user to search through said first information.

10. The method of claim 1, wherein said online relationship management system also enables each of said plurality of users to specify others as members of a community directory.

11. The method of claim 10, wherein each of said plurality of users can specify as members of said community directory to exchange access rights by sending emails to said others to invite said others to join online relationship management system.

12. The method of claim 11, wherein said emails include hyperlinks to permit direct authenticated access to said online relationship management system.

13. The method of claim 1, wherein said online relationship management system comprises at least one server and a plurality of client nodes logically connectable through the Internet.

14. The method of claim 1, wherein said online relationship management system comprises at least one server and a plurality of client nodes logically connectable through a local area network.

15. The method of claim 1, wherein said online relationship management system comprises at least one server and a plurality of client nodes connectable through the Internet.

16. The method of claim 1, wherein said online relationship management system enables said first user to select a main access group, wherein said selection of said main access groups allows all members of said selected main access group access to said first information.

17. The method of claim 16, wherein the main access group can be customized.

18. The method of claim 1, wherein said online relationship management system enables each of said plurality of users to select individual users not allowed access to said information of said selecting user.

19. The method of claim 1, wherein said online relationship management system enables each of said plurality of users to select individual users allowed access to said information of said selecting user.

20. The method of claim 1, the method further comprising the step of:
filtering said first information transmitted to said second user based on parameters set by said second user.

21. The method of claim 1, further comprising the steps of:
receiving, from said second user, an assignment of a first user information access right level for said first user;
associating said first user with said second user responsive to receipt of the identification of said first user from said second user, the identification of said second user from said first user, and the assignment of the first user information access right level;
receiving, from said second user, second information having a second information access right after associating said first user with said second user; and
transmitting, to said first user, said second information if said first user has provided the second user identification and the second information access right is consistent with the first user information access right level.

22. The method of claim 1, wherein the steps of receiving the identification of said second user and receiving the identification of said first user comprises the steps of:
receiving an invitation from said first user for transmission to said second user;
transmitting the invitation to said second user; and
receiving an acceptance of the invitation from the second user.

23. The method of claim 22, wherein the step of transmitting the invitation to said second user comprises the step of:
transmitting a hyperlink to said second user, the selection of which by said second user results in the acceptance of the invitation.

24. An apparatus for managing the sharing of personal information among a plurality of users of an online relationship management network, the apparatus comprising:
means for receiving, from a first user of said plurality of users, an identification of a second user of said plurality of users and an assignment of a second user information access right level for said second user and for receiving, from the second user, an identification of the first user;
means for associating said second user with said first user responsive to receipt of the identification of said second user from said first user, the identification of said first user from said second user, and the second user information access right level from said first user;
means for receiving, from said first user, first information having a first information access right after associating said second user with said first user, wherein said first information is to be entered into at least one input template of said online relationship management system to provide first structured information automatically generated from at least one output template based on said first information;
means for transmitting, to said second user, said first information if said second user has provided the first user identification and the first information access right is consistent with the second user information access right level;
means for receiving, from said first user, second information having a second information access right, wherein said second information is to be entered into said at least one input template of said online relationship management system; and
means for preventing transmission, to said second user, of said second information if the second user information access right level is inconsistent with said second information access right.

25. The apparatus of claim 24 wherein said apparatus includes a processor and a memory in electronic communication with said processor.

26. The apparatus of claim 24 wherein said means for receiving said identification and said assignment, said means for receiving first information and said means for transmitting said first information includes a server hosting said online relationship management software.

27. The apparatus of claim 26 wherein said means for receiving said identification and said assignment, and said means for receiving first information further include client software accessible by said first user, said client software logically connectable to said server.

28. The apparatus of claim 24, further comprising:
means for filtering said first information transmitted to said second user based on parameters set by said second user.

* * * * *